Figure 17:
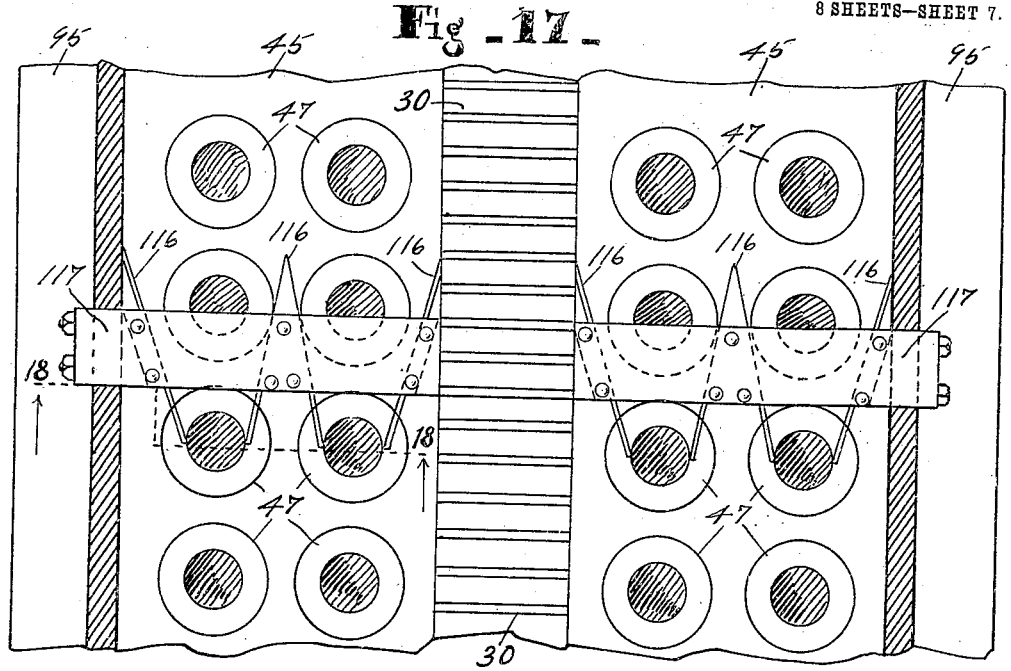

W. M. GENTLE.
COMPRESSING MACHINE.
APPLICATION FILED NOV. 13, 1908.
959,928.
Patented May 31, 1910.
8 SHEETS—SHEET 1.
Fig-1-
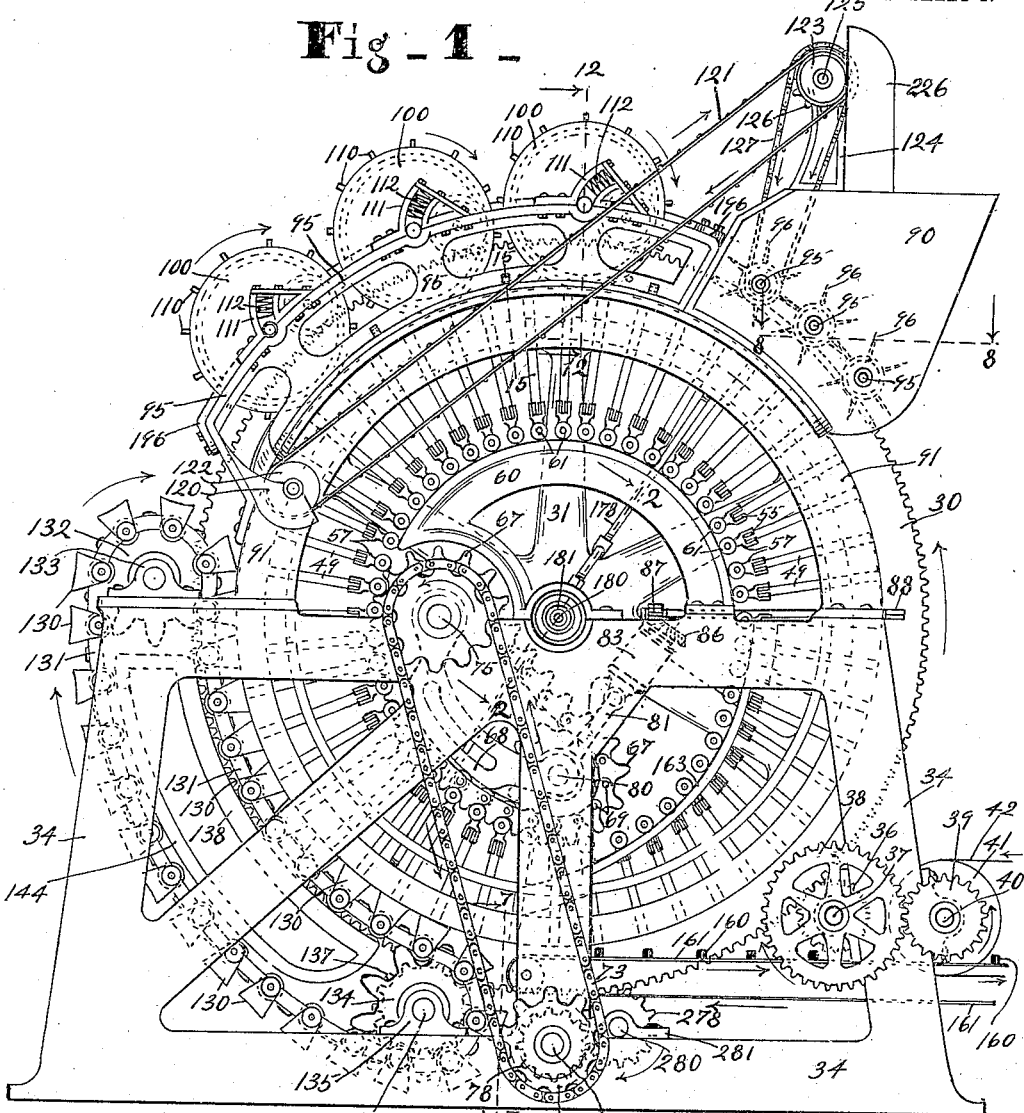
Fig-2-
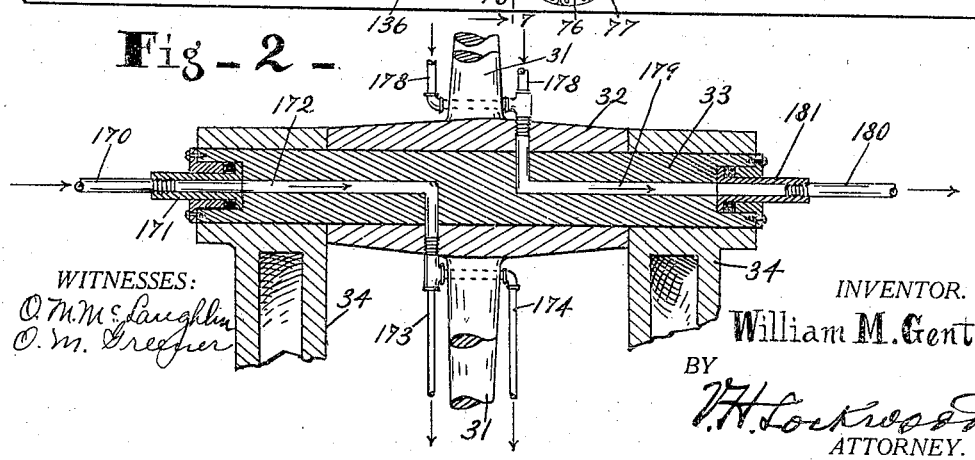
WITNESSES:
INVENTOR.
William M. Gentle.
BY
ATTORNEY.

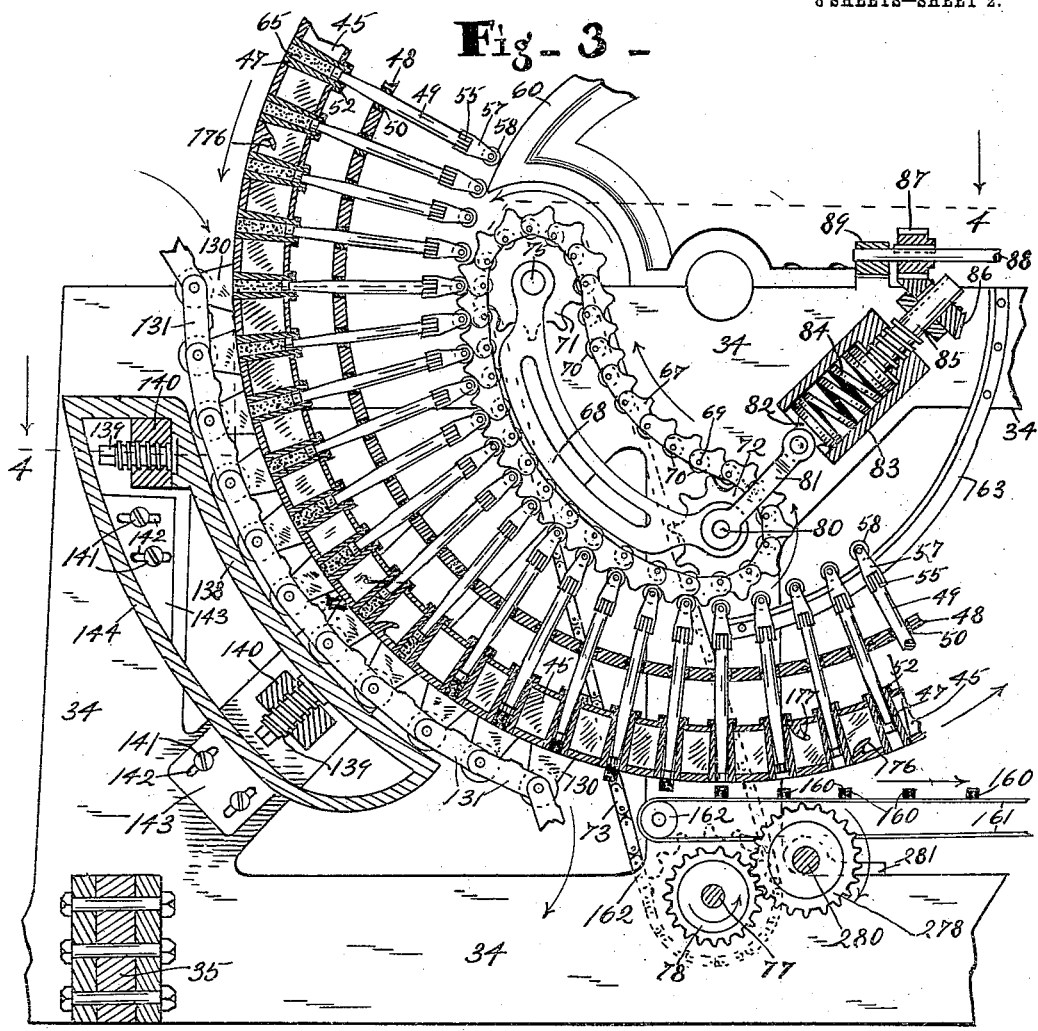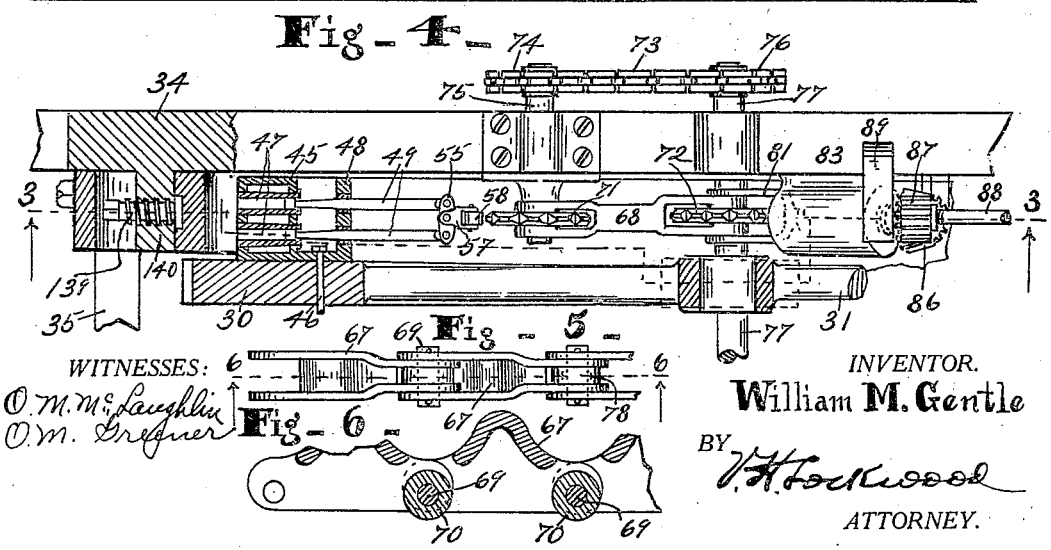

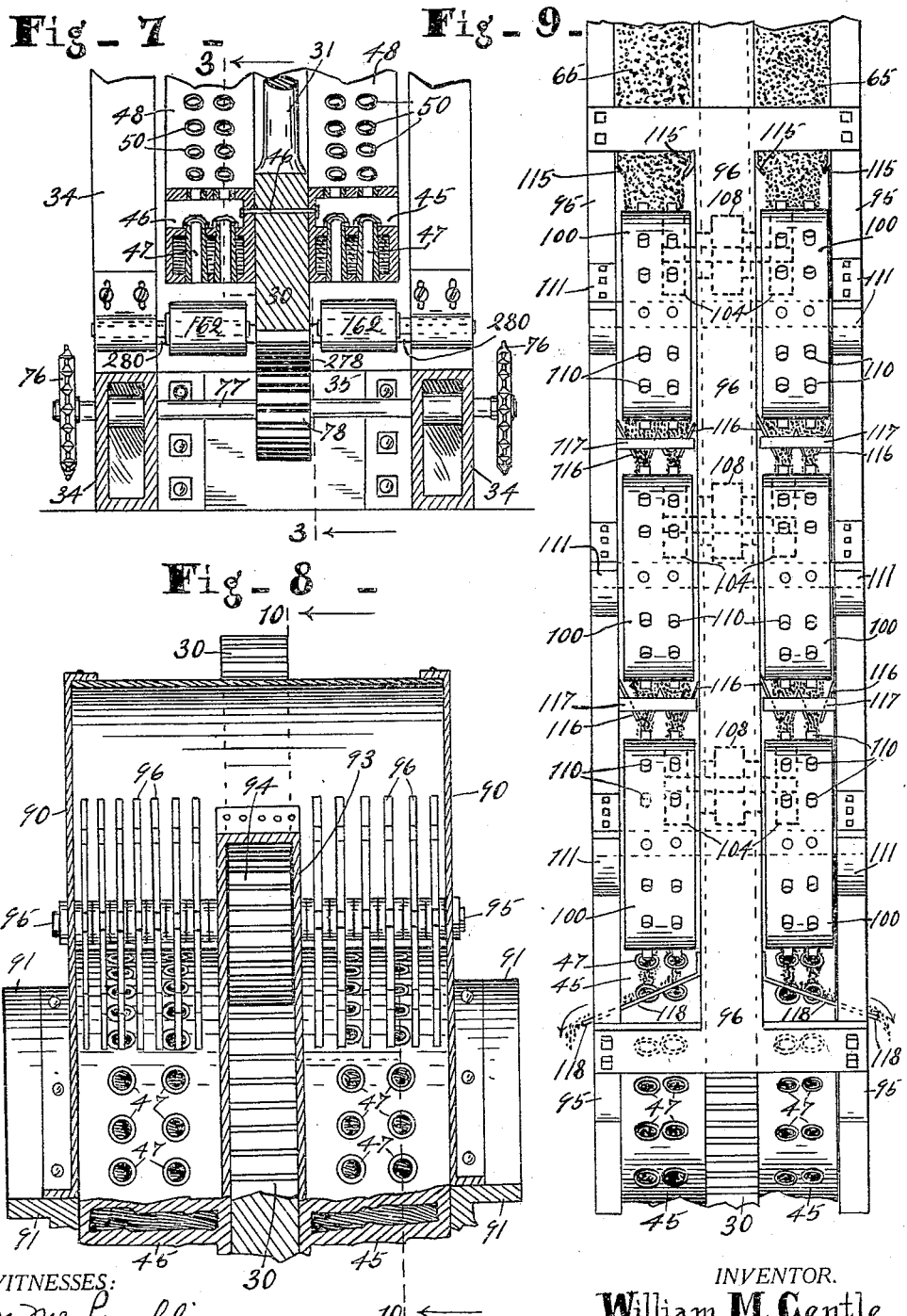

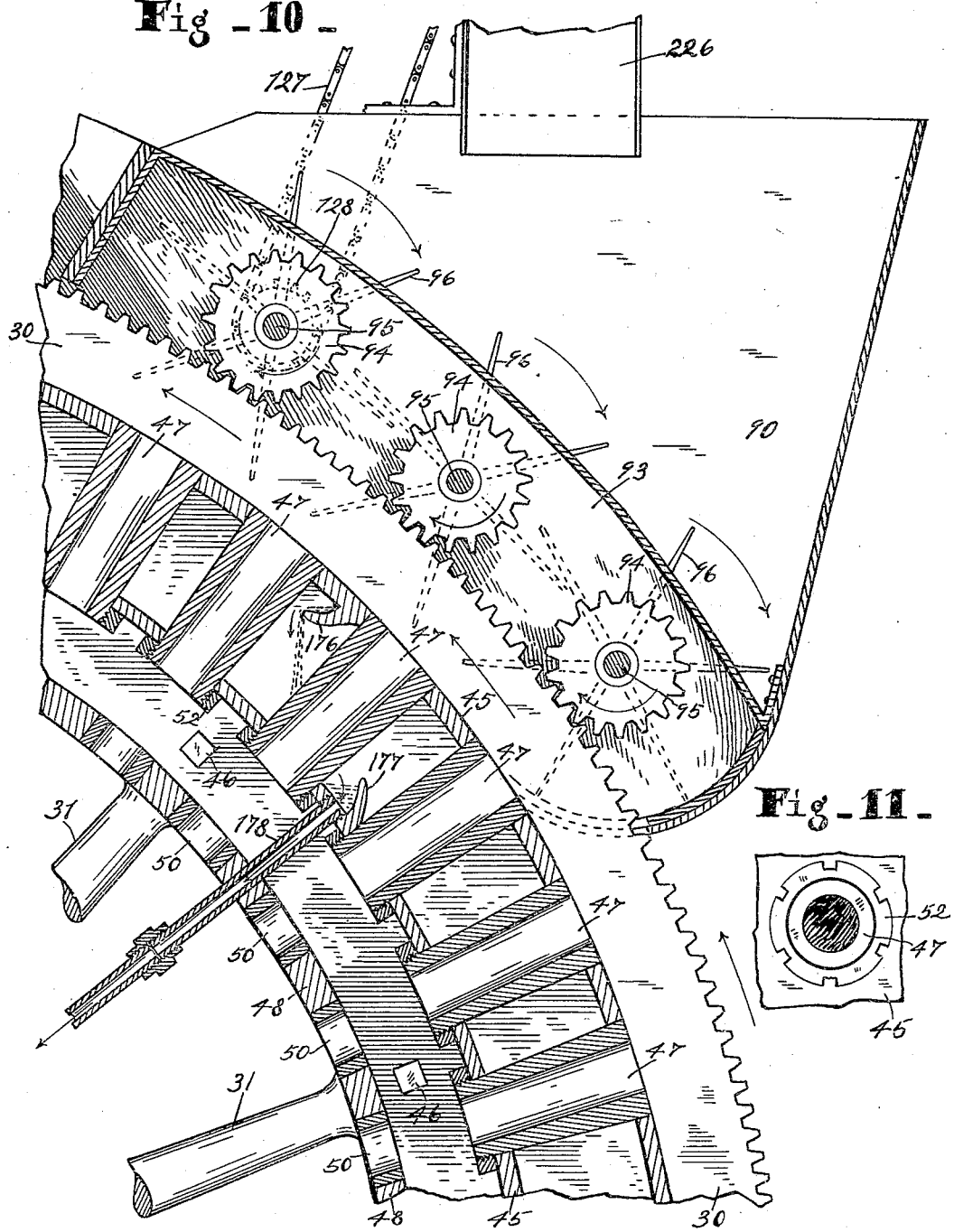

W. M. GENTLE.
COMPRESSING MACHINE.
APPLICATION FILED NOV. 13, 1908.
959,928.
Patented May 31, 1910.
8 SHEETS—SHEET 5.
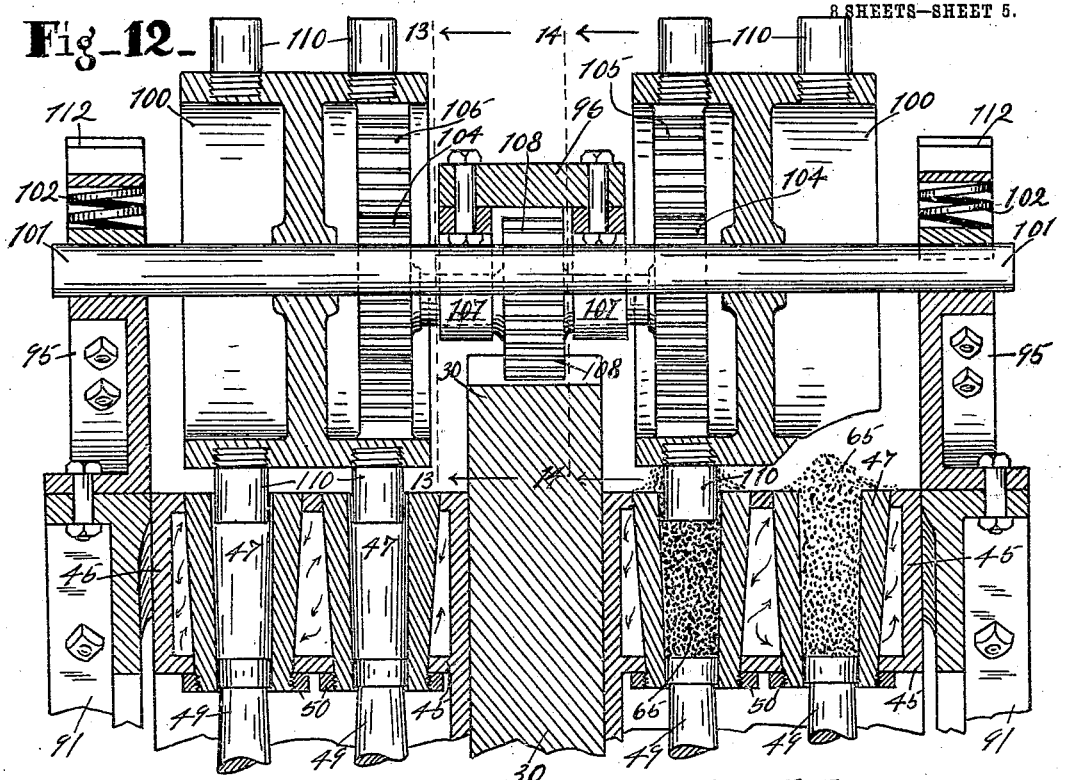
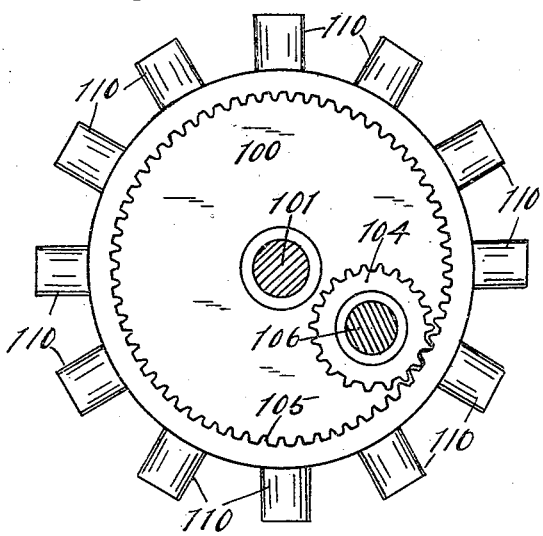
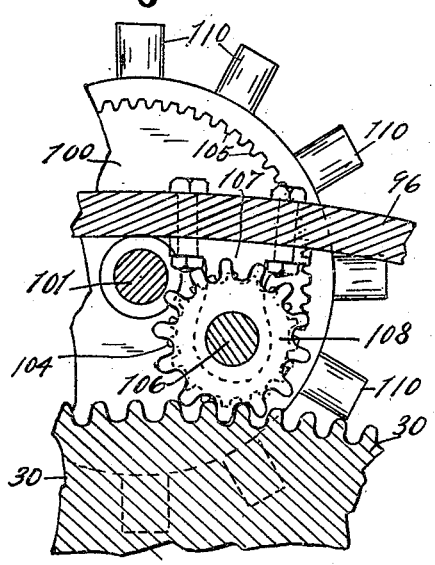
WITNESSES:
O. M. McLaughlin
O. M. Greener
INVENTOR.
William M. Gentle.
BY
V. H. Lockwood
ATTORNEY.

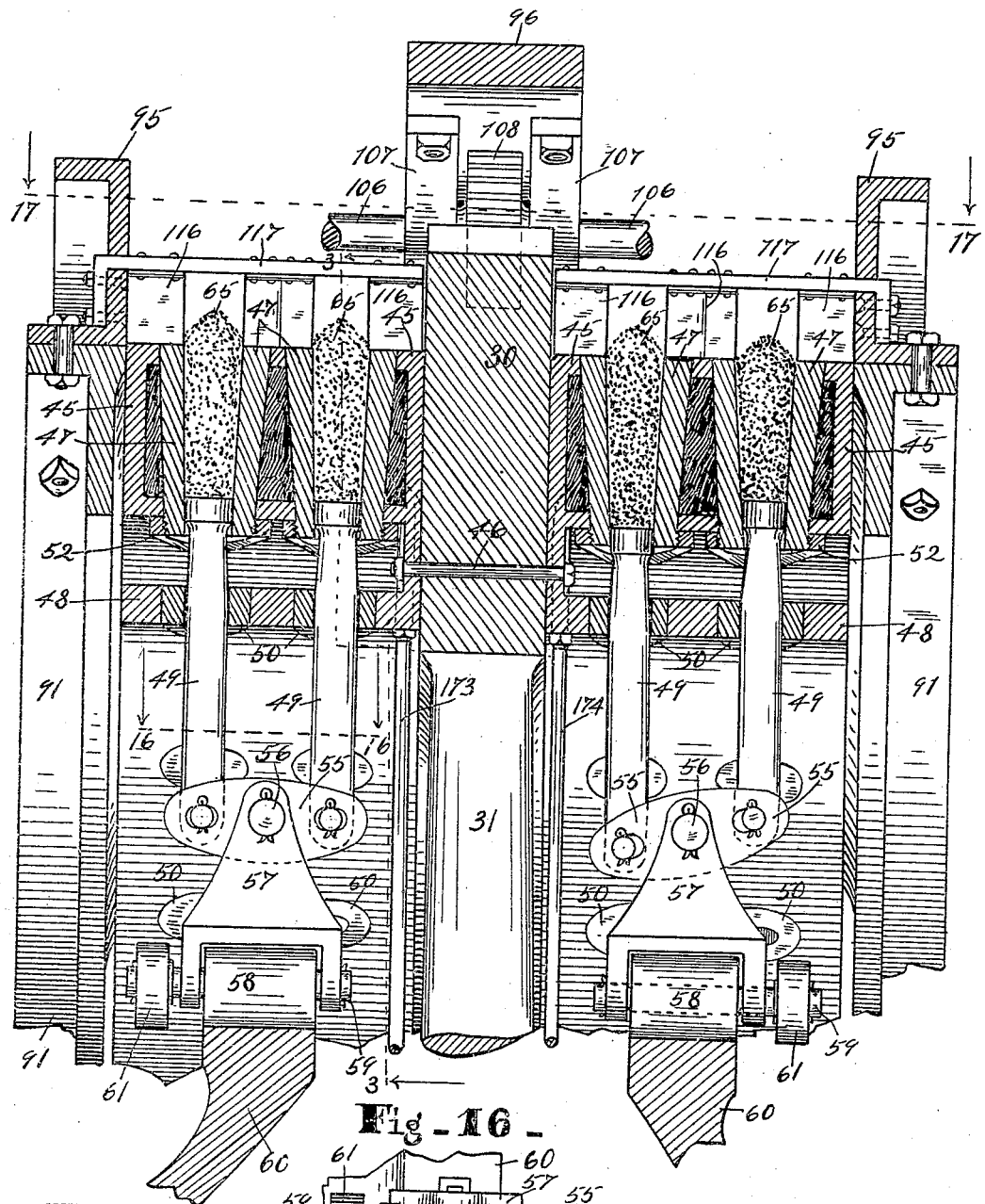

W. M. GENTLE.
COMPRESSING MACHINE.
APPLICATION FILED NOV. 13, 1908.

959,928.

Patented May 31, 1910.
8 SHEETS—SHEET 7.

WITNESSES:
O. M. McLaughlin
O. M. Greene

INVENTOR.
William M. Gentle.
BY
V. H. Lockwood
ATTORNEY.

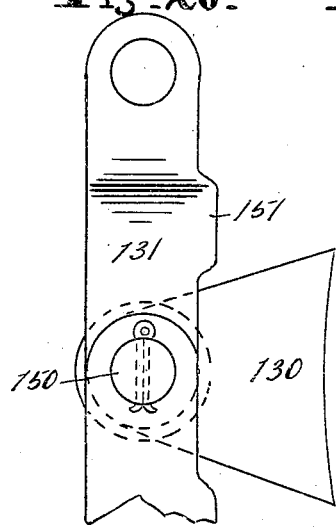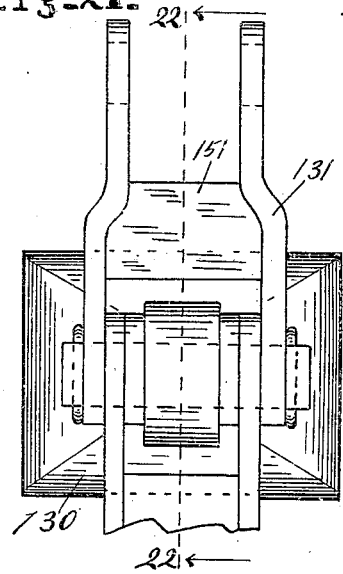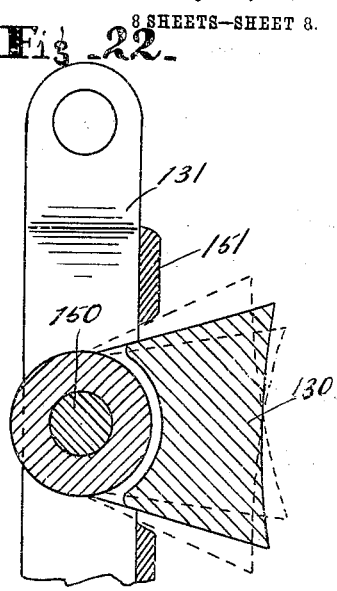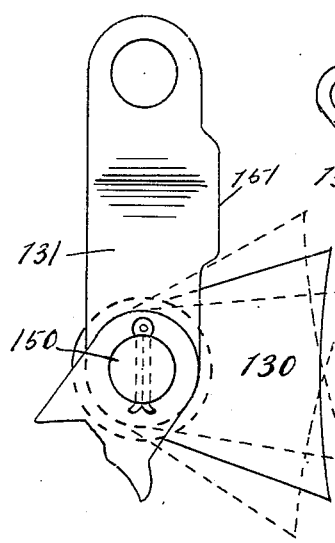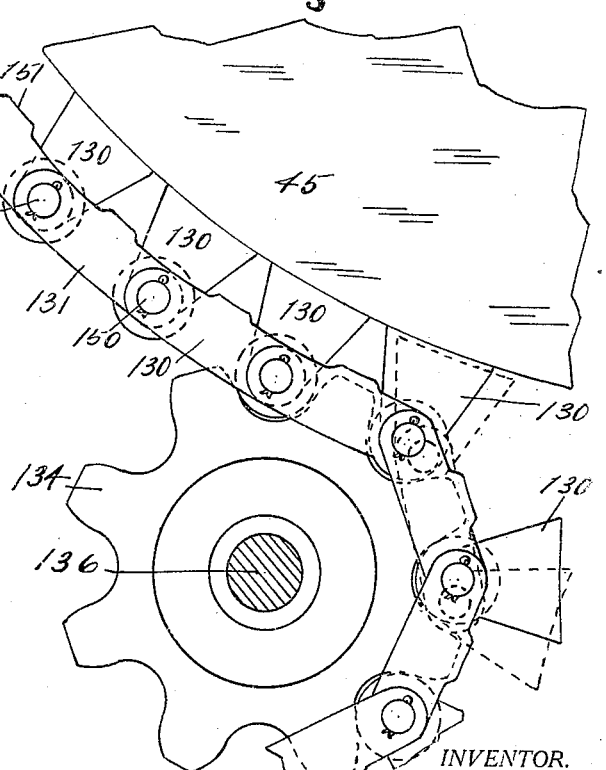

UNITED STATES PATENT OFFICE.

WILLIAM M. GENTLE, OF INDIANAPOLIS, INDIANA, ASSIGNOR TO NATIONAL PRESSED FUEL COMPANY, OF INDIANAPOLIS, INDIANA.

COMPRESSING-MACHINE.

959,928.

Specification of Letters Patent.

Patented May 31, 1910.

Application filed November 13, 1908. Serial No. 462,392.

*To all whom it may concern:*

Be it known that I, WILLIAM M. GENTLE, of Indianapolis, county of Marion, and State of Indiana, have invented a certain new and useful Compressing-Machine; and I do hereby declare that the following is a full, clear, and exact description thereof, reference being had to the accompanying drawings, in which like numerals refer to like parts.

The object of this invention is to improve the construction of briqueting and like compressing machines.

One feature of my invention consists in combining with a wheel, means secured to each side of the rim thereof in which one or more annular series of molds are mounted.

Another feature consists in making the means for mounting the molds hollow and introducing steam therein for heating the molds whereby they are effectively heated and yet the steam is kept away from the working parts of the machine.

Along with the foregoing are means within the chamber of the mold frame for catching the condensation water and removing the same.

Another feature of the invention consists in providing on each side of the mold wheel a pair of parallel series of molds arranged opposite each other in pairs, and a pair of plungers for each pair of molds, which plungers are both mounted on a single rocking plate to enable the plungers to compensate for the quantity of material in the molds and to equalize both the strain and the compression.

Another feature consists in tampers mounted above the mold wheel and following the hopper, said tampers consisting of wheels operating tangentially of the mold wheel and provided with projections adapted to enter the molds to cause the tamping; also the provision of scrapers or other means for concentrating the material that rides up over the wheel to and into the molds.

Another feature of my invention consists in mounting anvils on an endless chain for closing the molds, the mounting of the anvils being such as to enable them to easily approach and seat themselves on the molds and to leave the molds without difficulty. In the form herein shown this object is accomplished by mounting said anvils on the pins connecting the links of the sprocket chain so as to rock and be automatically adjusted to the surface of the periphery of the wheel, and the anvils are held against the molds by an adjustable plate having a surface curved concentrically and parallel with the mold wheel.

The full nature of this invention will be understood from the accompanying drawings and the following description and claims.

Figure 18:
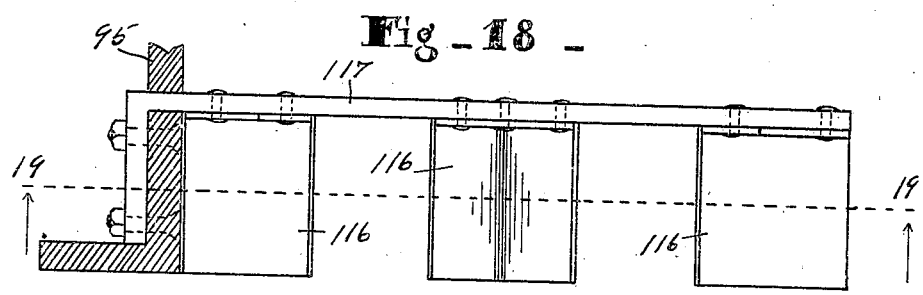
Figure 19:
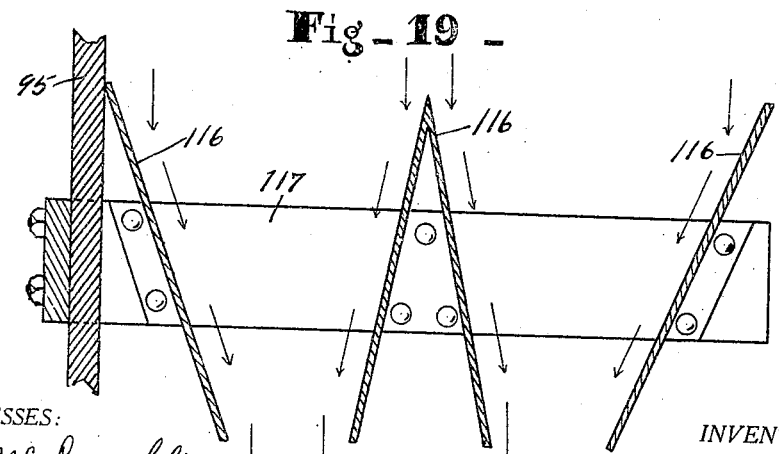

In the drawings Figure 1 is a side elevation of the device with obscured parts shown by dotted lines. Fig. 2 is a transverse section on the line 2—2 of Fig. 1. Fig. 3 is a vertical section of a part of the machine on a plane at a right angle to the axis thereof and substantially on the line 3—3 of Figs. 4, 7 and 15. Fig. 4 is a horizontal section on the irregular plane indicated by the line 4—4 of Fig. 3. Fig. 5 is a plan view of two or three links of the plunger actuating chain located in the middle portion of the mold wheel. Fig. 6 is a section on the line 6—6 of Fig. 5. Fig. 7 is a vertical transverse section on the line 7—7 of Fig. 1. Fig. 8 is a horizontal section on the line 8—8 of Fig. 1. Fig. 9 is a plan view of that part of the device shown in Fig. 1 containing the tamping wheels, the remainder of the mold wheel on both sides of the portion shown being broken away. Fig. 10 is a vertical section of a part of the device on a plane at a right angle to the axis of the mold wheel and substantially on the line 10—10 of Fig. 8. Fig. 11 is an elevation of the inner end of one of the molds and the adjacent inner peripheral surface of the mold wheel, which latter is partly broken away. Fig. 12 is a transverse vertical section on the line 12—12 of Fig. 1. Fig. 13 is a side elevation of a tamping wheel, parts being shown in section on the line 13—13 of Fig. 12. Fig. 14 is a vertical section on a plane at a right angle to the axis of the mold wheel substantially on the line 14—14 of Fig. 12, parts being broken away. Fig. 15 is a vertical transverse section through the upper part of the device on the line 15—15 of Fig. 1, parts being broken away. Fig. 16 is a horizontal section on the line 16—16 of Fig. 15. Fig. 17 is a horizontal section on the line 17—17 of Fig. 15. Fig. 18 is a vertical section on the line 18—18 of Fig. 17, showing only the vertically disposed scrapers and their mountings and omitting the mold wheels and molds. Fig. 19 is a horizontal section on the line 19—19 of Fig. 18 to further illustrate said scraper, the coöperating parts being omitted. Fig. 20 is a side elevation of one of the anvils and a portion of one of the links on which it is mounted. Fig. 21 is a rear elevation thereof. Fig. 22 is a section thereof on the line 22—22 of Fig. 21, the rocking positions of the anvil being shown by dotted lines. Fig. 23 is the same as Fig. 20 with the rocking positions of the anvil shown by dotted lines. Fig. 24 is a side elevation of a portion of a mold wheel and a portion of the anvil-carrying and actuating means.

The drawings herein show a mold wheel having a rim portion 30, see Fig. 15, spokes 31 and a hub 32, see Fig. 2, shrunk on a spindle 33, the ends of which have bearings in the stationary frame work of the machine. This frame work consists of two similar side frames 34 as seen in Figs. 1 and 2. There are connecting pieces 35 between said two side frames, see Figs. 3 and 4. The rim 30 of the mold wheel is peripherally toothed so as to be driven by the pinion 36, see Fig. 1, on the shaft 37 mounted on the frame work and carrying a spur wheel 38 that meshes with the gear 39 on the driving shaft 40 that carries the driving pulley 41 which is driven by the belt 42 from any suitable source of power. The parts described are geared so that a mold wheel will revolve in the direction indicated by the arrow in Fig 1.

The mold construction is as follows: On each side of the rim 30 of the mold wheel an annular mold frame 45 is secured by the bolts 46, as shown in Fig. 15. Each of said frames 45 consists of a hollow outer portion in which two circumferential rows of molds 47 are mounted and also an annular flange 48 through which the plungers 49 operate and are guided. The ring-like flange 48 is situated within the outer hollow portion of the frame 45 and has bearing plates 50 for said plungers 49. The molds 47 are tapering with the larger end outward and fitting within corresponding holes in the frame 45, as shown in Fig. 15. They are held in place by nuts 52 on the threaded inner and smaller ends of the molds which holds them tightly in place. The molds thus project through the chamber in the frame 45, leaving space around each mold whereby the molds may be heated by the introduction of steam into said chamber.

The plunger-actuating mechanism is constructed as follows: The plungers 49 are arranged in pairs on each side of the mold wheel, as shown in Fig. 15, and at their inner ends are pivoted to the opposite ends of rocking plates 55 that are centrally fulcrumed on the pin 56 in the carriage frame 57 which is mounted on the roller 58 that travels about on an annular track. The roller 58 is mounted loosely on the rod 59 and there is also a roller 61 mounted loosely on the outer end of said rod 59, as seen in Fig. 15. The plungers 49 are mounted on the rocking plate 55 in order that it may equalize the compression in the two molds in which the two plungers operate. This causes the briquets formed from the coal 65 in the molds to be subjected to a uniform compression and, therefore, avoid the difficulty of some of the briquets not being sufficiently compressed to hold together or have the desired solidity.

The track construction on which the plunger rollers 58 travel for causing the operation of the plungers is as follows: During the upper half of the travel of the plungers the rollers 58 ride over a nearly semi-circular track plate 60 that is concentric with the mold wheel, as shown in Fig. 1 and, therefore, during half of the revolution of the mold wheel the plungers will be maintained in one position, namely, the retracted position, whereby the mold shall be left free to receive a charge of material to be compressed. From the track plate 60 the plunger rollers 58 travel to the endless chain 67 that travels over the eccentrically disposed cam plate 68, so that the links of said chain gradually actuate the plungers for compressing the material in the molds. The links of said chain 67 are shown in Figs. 5 and 6. Each link has a central outwardly extending projection so there will be a recess between the projections of two adjacent links to receive the rollers 58 and hold them in place. The links are connected by pins 69 carrying anti-friction rollers 70 that engage and travel over the cam plate 68 and the sprocket wheels 71 and 72 at the ends of said plate 68. The chain 67 is driven in the direction indicated by the arrow in Fig. 3 at substantially the same speed as the mold wheel so that the only action of the links of said chain 67 against the plungers is a radial action whereby the injury to the plungers and their bearings due to traveling over a stationary eccentric surface is avoided. The chain 67 is driven by the sprocket chain 73 which at one end runs over the sprocket 74 on the shaft 75 on which the sprocket wheel 71 is secured and at the other end said chain 73 runs over a sprocket wheel 76 on a shaft 77, see Figs. 3 and 4. As seen in Fig. 7, the shaft 77 extends transversely through the device and is mounted in the side frames 34 so as to drive the plungers on both sides of the machine. The shaft 77 is driven by a pinion 78 secured thereon that meshes with the pinion 278 on the shaft 280 mounted in bearings 281. The pinion 278 meshes with the toothed periphery of the rim 30 of the mold wheel.

The eccentric bearing plate 68 is held in position by a yielding means connected on one end thereof and forcing the same outwardly as seen in Fig. 3. The end of the plate 68 which carries the sprocket wheel 71 is pivoted so as to be unyielding. The pin 80 at the other end of the plate 68 and which carries the sprocket 72 is yieldingly mounted in a yoke 81 that has a pivoted head 82 in the cylinder 83 containing a spring 84 that acts against the head 82. Thereupon the spring 84, acting through the head 82 and yoke 81, yieldingly forces the free end of the plate 68 outwardly and thus actuates the plungers through the links of the chain 67. The tension of the spring 84 is regulated through a threaded rod 85 screwing through one end of the cylinder 83 and pressing against the spring at one end and at the other end carrying a bevel gear 86 for rotating it so that as the rod 85 is screwed in the tension of the spring will be increased and when it is screwed outwardly the tension will be diminished. The bevel gear 86 is actuated by the pinion 87 on the rod 88, one end of which is fulcrumed in the bearing 89 and at its other end having a bearing in the frame work and at its outer end is square to receive a wrench.

The molds mounted in connection with the mold wheel extend radially thereof and have their outer ends open so that material may be introduced into the molds when the molds are at the top of the wheel and be discharged therefrom as the molds are at the bottom of the wheel. A hopper 90 is mounted on the semi-circular frame pieces 91, see Figs. 1 and 15, so that the mold wheel will revolve through the lowest part of the hopper, as shown in Figs. 8 and 10. The material to be compressed is introduced into said hopper. There is a centrally disposed casing 93 through which the toothed portion of the periphery of the mold wheel moves and meshes with a number of gear wheels 94 on shafts 95 which have bearings in said casing 93 and also in the side of the hopper 90, as shown in Fig. 8. The shafts 95 carry agitating fingers 96 which during the revolution constantly stir and agitate the material in the hopper whereby it will be fed by gravity into the open outer ends of the molds, as seen in Figs. 8 and 15. In the form herein shown the hopper contains three sets of these agitators. This arrangement also causes the agitating fingers 96 to move the material near the wheel or molds up on the wheel or in the direction of the revolution of the wheel and the hopper is preferably located in advance of the top of the wheel, as seen in Fig. 10.

Following the hopper 90 there is a tamper frame segmental in form and having sides 95 secured on the frames 91 and top plates 96 secured on the side plates 95. In this frame and over the molds of the mold wheel tamping wheels 100 are mounted, as seen in Figs. 9 and 12. Said wheels are mounted on the shaft 101 that is mounted in the side plates 95 and is driven by the pinion 104 that meshes with an internal gear 105 on the tamping wheel 100, see Figs. 12 and 13, which pinion 104 is mounted on the shaft 106 mounted in bearings 107 secured to the plate 96 and carries the spur wheel 108 that meshes with the teeth on the periphery of the mold wheel. Said wheels 100 have each two series of tampers 110 projecting from the periphery thereof and so located and spaced that they successively enter the molds as the tampers and the molds revolve. The shaft 101 is yieldingly mounted, as seen in Figs. 1 and 12, so that the tampers can yield in accordance with the quantity of material in the molds. To this end there is a segmental shaped bearing 111 mounted on the plates 95 and curved concentrically with the shaft 106 of the pinion 104 and carrying a spring 112 that tends to hold the shaft 101 down in its lowermost position. As the shaft 101 yields it moves concentrically with the center of the wheel 104 and, therefore, maintains engagement between the wheel 104 and the internal gear of the tamping wheel 100.

Scrapers 115 are mounted as shown in Fig. 9, some on the side plates 95 and some on the top plate 96 and bend inwardly and concentrate the material 65 over the mold and in position to be acted upon by the tampers. Between the tampers there are also scrapers 116 located as shown in Figs. 17 to 19 and mounted on the cross bars 117, they being so arranged as to concentrate the material over each series of molds and cause it all to either enter the mold or hopper upon the mold, as shown in Figs. 12 and 15. The material that is thus not forced into the mold by the scrapers and tampers is deflected by the scrapers 118, shown in Fig. 9, into a pocket 120, see Fig. 1, which is secured to the side plate 95, and thence it is removed by a conveyer 121 back to the hopper 90 so the material will not be wasted. The conveyer 121 operates over the pulley 122 in the pocket 120 and the pulley 123 mounted on the stand 124 extending up from the hopper. The pulley 123 is on the shaft 125 which carries a sprocket wheel 126 over which a sprocket chain 127 extends from the sprocket 128, shown by dotted lines in Fig. 10 which is secured on the shaft 95 and whereby it and the conveyer 121 are actuated. The chute 226 receives the material from the conveyer 121 and deposits the same into the hopper.

As the mold wheel revolves farther after the molds have been filled with material and tamped and just before the plungers reach the horizontal position, the outer ends of the molds are closed by anvils 130 on an endless chain 131 which extends concentrically of the mold wheel for about 90 degrees, as shown in Fig. 1. The chain 131 is mounted on a sprocket 132 in bearings 133 on the top of the left hand end of the main frame work. The other end of the chain 131 is mounted on a sprocket wheel 134 under the mold wheel in bearings 135 on the lower part of the frame work, as seen in Fig. 1. The shaft 136 on the latter sprocket wheel 134 carries a pinion 137 that meshes with the toothed periphery of the mold wheel and the chain carrying series of anvils 130 is actuated thereby in the direction of the arrows shown in Fig. 3. The anvils are held against the molds by the plate 138 that is curved concentrically and parallel with the mold wheel and is held in place by screws 139 that screw through lugs 140 extending through the main frame work, as appears in Fig. 3. These screws permit the plate 138 to be properly adjusted for regulating the work and enabling the plate 138 to be released quickly if the machine would choke. The plate 138 is further held by the set screws 141 passing through slots 142 in plates 143 from the rearward extension 144 of the plate 138, as seen in Fig. 3. Screws 141 enter the frame of the machine. The anvils 130 are loosely mounted on the pins 150 that unite the links of the chain 131, as seen in Figs. 20 to 24. The links have cross pieces 151, both above and below each anvil, as seen in Figs. 21 and 22. The end of the anvil is concave to conform to the periphery of the frame 45 in which the molds are secured, as seen in Figs. 20 and 24. With this construction the anvils snugly fit against the periphery of the mold frame 45 and close the mold and are enabled to rock in either direction to some extent whereby they can properly approach the molds as they pass over the upper sprocket wheel 132 and properly leave the molds as they pass about the sprocket wheel 134. The cross-pieces 151 limit the rocking movement of said anvils. The anvil 130 is made wide enough to cover one transversely disposed pair of molds that lie side by side.

As the briquets 160 are forced from the molds at the bottom of the mold wheel, see Fig. 3, they drop upon the conveyer 161 that passes over a pulley 162 and whereby the briquets are conveyed away from the machine. After the plungers have discharged the briquets 160 the rollers 61 connected therewith engage the eccentric plate or track 163, see Figs. 1 and 3, which withdraws the plungers and returns them to their original position for engaging the plate 60.

In order to heat the molds and yet not expose any of the working parts of the machine to the steam, I provide the hollow mold frame 45 heretofore described and shown in Fig. 10, and in it I introduce steam through the pipe 170, see Fig. 2, the inner end of which is fast in the stuffing box 171 which communicates with the passage way 172 that in turn communicates with the pipes 173 and 174 that lead to the chamber in the casing or frame 45. The condensation water is caught and conveyed away from said chamber, as seen in Fig. 10. There on the exterior inner wall of the chamber in the casing 45 are ribs or dams 176 that catch the condensation water and as the wheel revolves the water discharges through said ribs 176 onto the opposite surface of said chamber where it is caught by another rib 177 and thence flows through tube 178 that communicates with the passageway 179 in the shaft 33, see Fig. 2, and that passage-way communicates with the pipe 180 with the bushing 181. There are preferably several ribs 176 and only one rib 177 for each chamber.

What I claim as my invention and desire to secure by Letters Patent is:

1. A compressing machine including a revoluble wheel, molds in the rim of the wheel for receiving the material to be compressed, radially disposed plungers mounted in connection with the wheel for compressing the material in the molds, an eccentrically disposed cam plate mounted stationary within the wheel, and a chain movable over said cam plate for actuating the plungers, whereby there will be no friction between the inner ends of the plungers and the means for actuating the same.

2. A compressing machine including a revoluble wheel, molds in the rim of the wheel for receiving the material to be compressed, radially disposed plungers mounted in connection with the wheel for compressing the material in the molds, an eccentrically disposed cam plate mounted stationary within the wheel, means for yieldingly supporting said cam plate at one end, and a chain movable over said cam plate for actuating the plungers.

3. A compressing machine including a revoluble wheel, radially disposed molds mounted in connection with the rim thereof, radially disposed plungers for compressing the material in the molds, an eccentrically disposed cam plate mounted stationary within the wheel for causing the actuation of said plungers, means for yieldingly supporting one end of said cam plate, and means externally operative for regulating said yielding means in order to control the pressure of the plungers.

4. A compressing machine including a revoluble wheel, molds in the rim of the wheel for receiving the material to be compressed, radially disposed plungers mounted in connection with the wheel for compressing the material in the molds, an eccentrically disposed cam plate mounted stationary within the wheel, a sprocket wheel on each end of said cam plate, a chain operating thereon longitudinally over the surface of said cam plate and against which the inner ends of the plungers bear and whereby the plungers are actuated, and means for driving said chain at substantially the same relative speed as the mold wheel.

5. A compressing machine including a revoluble wheel having a rim, a hollow mold casing secured to each side of said rim and provided with mold holes tapering inwardly, tapering molds within said mold holes screw-threaded on their inner ends, and nuts on the inner ends of the molds for holding them in place.

6. A compressing machine including a revoluble wheel, a hollow casing secured thereto, molds secured radially within said casing, means for introducing steam into said casing, a rib on the inner surface of the outer wall of said casing for catching and discharging the condensation water against the inner wall of said casing, a tube leading from the inner wall of said casing for conveying the water therefrom, and a rib on the inner wall of said casing and adjacent said tube outlet for directing the condensation water to the outlet.

7. A compressing machine including a pair of molds, a pair of plungers for said molds, and rocking means to which said plungers are pivoted whereby the action and pressure of the plungers will be equalized.

8. A compressing machine including a pair of molds, a pair of plungers for said molds, rocking means to which said plungers are pivoted, and means with which said rocking means is pivotally connected for actuating said rocking means and plungers.

9. A compressing machine including a revoluble mold wheel, a hopper mounted above the mold wheel and through which the molds move, whereby the molds will be charged with material from the hopper, tampers mounted in position to tamp the material in the molds after the same have passed through the hopper, and stationary means between the tampers for concentrating the material on the mold wheel after it leaves the hopper and a tamper so that it will enter the molds.

10. A compressing machine including a revoluble mold wheel, radially disposed molds mounted in connection therewith, a hopper through which the molds move for receiving the material, a successive series of tamping means, and a successive series of means for concentrating the material on the mold wheel into and over the molds, substantially as set forth.

11. A compressing machine including a mold wheel, radially disposed molds mounted in connection therewith with their outer ends open, a pair of wheels revolving in a direction opposite to the direction of the mold wheel, a chain on said wheels, and an anvil pivotally mounted at one end in connection with said chain so as to rock independently of the chain and adjust itself in position to close the mold with its other end, the outer end of said anvil being concave to agree with the periphery of the mold wheel.

12. A compressing machine including a mold wheel, radially disposed molds mounted in connection therewith with their outer ends open, a pair of wheels revolving in a direction opposite to the direction of the mold wheel, a chain on said wheels, an anvil pivotally mounted at its inner end in connection with said chain in position to close the mold, the outer end of said anvil being concave to agree with the periphery of the mold wheel, and stops on the chain for limiting the oscillatory movement of said anvil.

13. A compressing machine including a revoluble mold wheel, molds radially disposed in the periphery thereof, anvils for closing the outer ends of said molds, a chain on which said anvils are mounted and which is provided with anti-friction rollers, a plate curved concentrically with the mold wheel over which said chain moves for pressing the anvils against the molds, and means for adjustably mounting said plate in connection with the frame-work whereby it may be properly held to its work.

14. A compressing machine including a revoluble mold wheel, molds radially disposed in the periphery thereof in pairs, radially disposed plungers for compressing the material therein arranged in pairs for corresponding pairs of molds, a rocking actuating means on which said plungers are pivotally mounted whereby their pressure will be equalized, and a single means for closing the outer ends of each pair of molds.

15. A compressing machine including a revoluble mold wheel, molds radially disposed in the periphery thereof in pairs, radially disposed plungers for compressing the material arranged in pairs for corresponding pairs of molds, a plate provided with slots in the ends, pivot pins from the inner ends of said plungers extending through said slots in said plate, and means for fulcruming said plate that travels with the plungers as the wheel revolves.

16. A compressing machine including a revoluble mold wheel, molds radially disposed in the periphery thereof in pairs, radially disposed plungers for compressing the material therein arranged in pairs for corresponding pairs of molds, a stationary cam within said wheel, a roller adapted to ride on said cam, a frame mounted on the roller and adapted to ride over the periphery of said cam, and a plate fulcrumed in said frame so as to rock with the ends of said plate pivoted to the inner ends of said plungers, whereby the pressure of the plungers will be equalized, the frame will travel with the plungers, and the roller will be held on said cam.

In witness whereof, I have hereunto affixed my signature in the presence of the witnesses herein named.

WILLIAM M. GENTLE.

Witnesses:
O. M. GREENER,
O. M. McLAUGHLIN.